United States Patent
Fan et al.

(10) Patent No.: US 7,266,119 B2
(45) Date of Patent: Sep. 4, 2007

(54) NAT SYSTEM FOR SUPPORTING MOBILE IP IN PRIVATE NETWORKS AND ITS METHOD

(75) Inventors: Jung-Hsuan Fan, Taipei (TW); Chien-Chao Tseng, Hsinchu (TW); Chun-Chieh Wang, Kaohsiung (TW)

(73) Assignee: Industrial Technology Research Institute, Hsinchu County (TW)

( * ) Notice: Subject to any disclaimer, the term of this patent is extended or adjusted under 35 U.S.C. 154(b) by 483 days.

(21) Appl. No.: 11/022,864

(22) Filed: Dec. 28, 2004

(65) Prior Publication Data

US 2005/0226194 A1    Oct. 13, 2005

(30) Foreign Application Priority Data

Apr. 9, 2004   (TW)   .............. 93109941 A

(51) Int. Cl.
*H04L 12/56* (2006.01)
(52) U.S. Cl. .............. 370/389; 370/392; 370/331; 370/338; 370/401; 455/433; 455/436
(58) Field of Classification Search .............. 370/331, 370/338, 401, 392, 389; 455/433, 436
See application file for complete search history.

(56) References Cited

U.S. PATENT DOCUMENTS 6,999,437 B2 *  2/2006  Krishnamurthi et al. .... 370/331

7,079,520 B2 *  7/2006  Feige et al. .............. 370/338
2003/0123421 A1   7/2003  Feige et al.
2004/0090958 A1 *  5/2004  Park et al. ............... 370/389

FOREIGN PATENT DOCUMENTS

WO    PCT 03/058922    7/2003

OTHER PUBLICATIONS

H. Levkowetz et. al.; *Mobile IP Traversal of Network Address Translation (NAT) Devices*; Apr. 2003; The Internet Society; pp. 1-33.

* cited by examiner

*Primary Examiner*—Duc M. Nguyen
*Assistant Examiner*—Aung T. Win
(74) *Attorney, Agent, or Firm*—Bacon & Thomas, PLLC

(57) ABSTRACT

A NAT system for supporting mobile IP in private networks and its method. A mobile node moves from its home network to a foreign private network and obtains a CoA from the private network. The mobile node sends a registration packet to a home agent in the home network. The registration packet has a swap address option field. A NAT device in the private network swaps the source address with the swap address of the registration packet, and translates the source address into the public address of the NAT device, thereby sending the registration packet to the home agent. After receiving the registration packet, the home agent responds a registration reply packet having a swap address option field filled in the CoA. The NAT device swaps the destination address with the swap address of the registration reply packet, thereby sending the registration reply packet to the mobile node.

20 Claims, 4 Drawing Sheets

NAT SYSTEM FOR SUPPORTING MOBILE IP IN PRIVATE NETWORKS AND ITS METHOD

BACKGROUND OF THE INVENTION

1. Field of the Invention

The invention relates to a technical field of network address translation (NAT) and, more particularly, to a NAT system for supporting mobile IP in private networks and its method.

2. Description of Related Art

In the Internet, an IP address is regarded as the location of a machine. Packet transferred in the Internet also uses IP addresses to represent the source and destination. Currently, IP technology widely used in the Internet is IP version 4, which uses 32-bit address. However, due to rapidly growing machine number but limited address length, available public IP addresses are insufficient gradually.

To overcome this, a NAT device is introduced to slow down the consumption of IP addresses and make regions having a shortage of IP addresses continue to work. However, with the introduction of the NAT device, IP losses its transparency. For example, the NAT device causes that mobile IP protocol cannot work normally. FIG. 1 is a schematic diagram of applying mobile IP to a private network 102 having a NAT device 14. As shown in FIG. 1, when a mobile node (MN) 11 moves from its home network 101 to a foreign private network 102, the mobile node 11 obtains a care-of address (CoA) (192.168.0.1) from a DHCP (Dynamic Host Configuration Protocol) server 13 in the private network 102. According to mobile IP protocol, the mobile node 11 registers to the home agent 12 in the home network 101 after obtaining the CoA. The mobile node 11 sends a registration packet 15 with a header containing a source address indicative of the CoA (192.168.0.1) and a destination address indicative of an address (120.105.1.1) of the home agent 12. The content of the registration packet 15 contains the CoA (192.168.0.1) where the mobile node locates. The registration packet 15 is processed by the NAT device 14 to translate the source address of the header from the CoA (192.168.0.1) into the public IP address (140.113.1.1) of the NAT device 14 for further sending the registration packet 15 to the home agent 12. The home agent 12 unpacks the content after receiving the registration packet 15 and thus knows that the mobile node 11 locates at the CoA (192.168.0.1). Next, the home agent 12 responds a registration reply packet 16 with a header containing a source address indicative of the address (120.105.1.1) of the home agent 12 and a destination address indicative of the public IP address (140.113.1.1) of the NAT device 14. Thus, the NAT device 14 translates the destination address from the public IP address (140.113.1.1) into the CoA (192.168.0.1) and the registration reply packet 16 is accurately sent to the mobile node, thereby completing the registration. Next, when the home agent 12 tunnels the data packet 17 to the mobile node 11, which is achieved by using the CoA (192.168.0.1) obtained in the registration as the destination address, the destination address (in this case, the CoA (192.168.0.1)) is a private address and cannot be sent by the home network 101 to the private network 102 accurately, thereby making mobile IP protocol out of work.

To overcome this, a direct solution is proposed in which, after the home agent 12 receives and unpacks the registration packet 15, it further determines if the address (CoA) of the mobile node 11 included in the unpacked content is the same as the source address of the packet 15. If the two addresses are different, it indicates that the registration packet 15 is processed by the NAT. In this case, after replying and completing the registration, the home agent 12 uses the source address of the original registration packet 15 (before the NAT) as the destination address for sending packets to the mobile node 11. Namely, the CoA of the mobile node 11 obtained by the content of the registration packet is not the destination address. Accordingly, data packet 17 is sent to the NAT device 14 for address translation and further to the mobile node 11. However, the cited solution requires translating different CoAs of mobile nodes or devices 11 into different public addresses so that the NAT device 14 can transfer data packets to the respective mobile nodes or devices 11 accurately. As such, it cannot save any public address.

Therefore, it is desirable to provide an improved method to mitigate and/or obviate the aforementioned problems.

SUMMARY OF THE INVENTION

The object of the invention is to provide a NAT system for supporting mobile IP in private networks and its method, which can apply mobile IP to a private network without using any table or port number and be compatible with current NAT technology.

According to a feature of the invention, a method for supporting mobile IP in private networks is provided in which a mobile node moves from its home network to a foreign private network and obtains a CoA from the private network. The private network has a NAT device. In the method, the mobile node sends a registration packet to a home agent in the home network. The registration packet has a header with a source address field containing the CoA, a destination address field containing an address of the home agent and a swap address option field. The NAT device swaps contents of the source and the swap address fields of the registration packet, and translates the content of the source address field into a public address of the NAT device according to NAT regulations, thereby sending the registration packet to the home agent. After receiving the registration packet, the home agent responds a registration reply packet with a header having a source address field containing the address of the home agent, a destination address field containing the public address of the NAT device, and a swap address option field filled therein the CoA. The NAT device swaps contents of the destination and the swap address fields of the registration reply packet, thereby sending the registration reply packet to the mobile node.

According to another feature of the invention, a NAT system for supporting mobile IP in private networks is provided. The system includes a home agent, at least one mobile node and a NAT device. The home agent is implemented in a home network. The mobile node moves from the home network to a foreign private network and obtains a CoA from the private network. The mobile node sends a registration packet to a home agent in the home network. The registration packet has a header with a source address field containing the CoA, a destination address field containing an address of the home agent and a swap address option field. The NAT device implemented in the private network swaps contents of the source and the swap address fields of the registration packet and translates the content of the source address field into a public address of the NAT device according to NAT regulations, thereby sending the registration packet to the home agent; or swaps contents of a destination and a swap address fields of a registration reply packet, thereby sending the registration reply packet to the mobile node. After receiving the registration packet, the home agent responds the registration reply packet. The registration reply packet has a header with a source address field containing the address of the home agent, a destination address field containing the public address of the NAT device and a swap address option field filled therein the CoA.

Other objects, advantages, and novel features of the invention will become more apparent from the following detailed description when taken in conjunction with the accompanying drawings.

DETAILED DESCRIPTION OF THE PREFERRED EMBODIMENT

The NAT system and method for supporting mobile IP in private networks in accordance with the present invention defines a swap address option field in an inherent IP header and thus provides an address swap function to support mobile IP in a private network.

Figure 1:
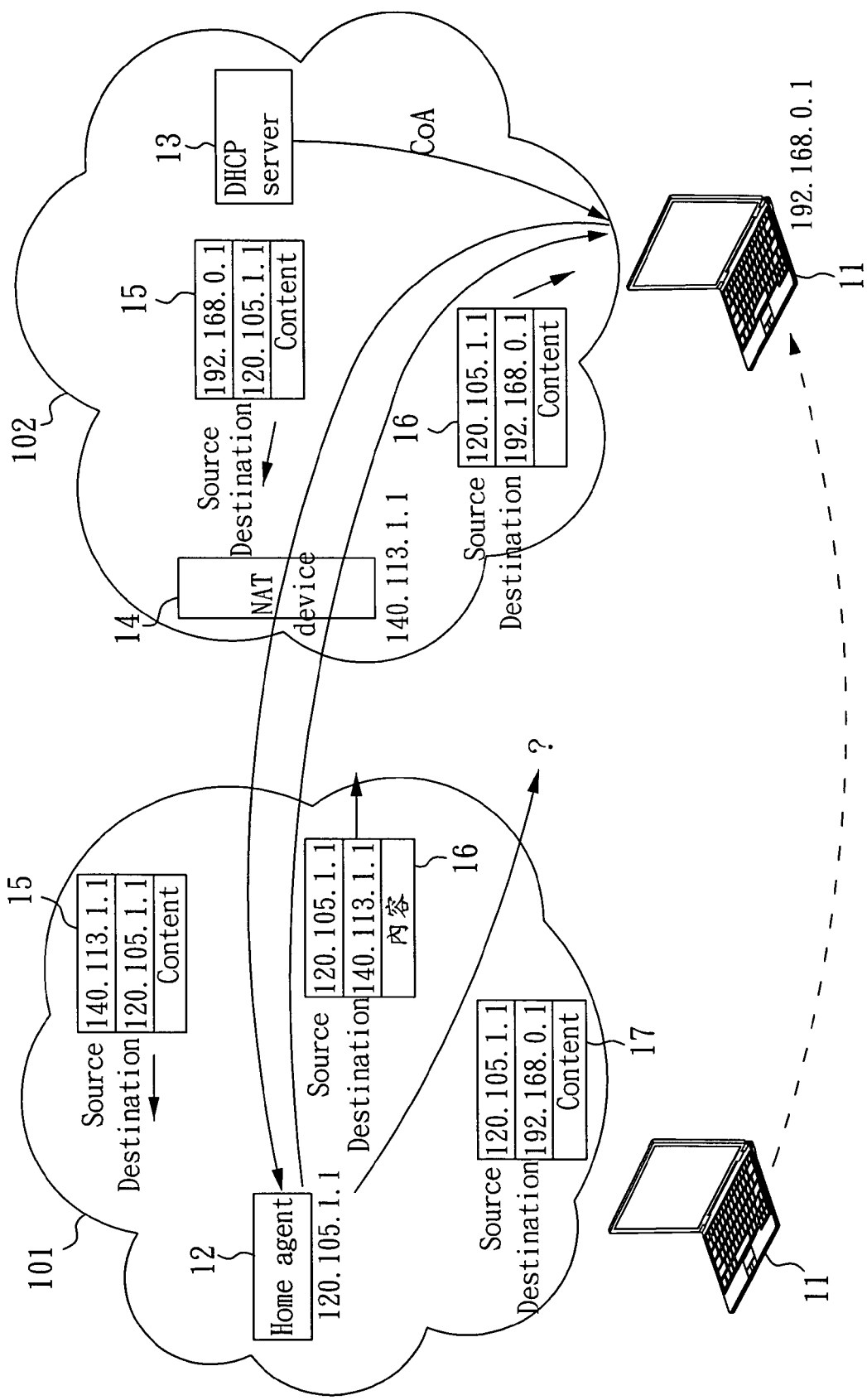
FIG. 1 is a schematic diagram of applying mobile IP protocol to a private network having a NAT device.
Figure 2:
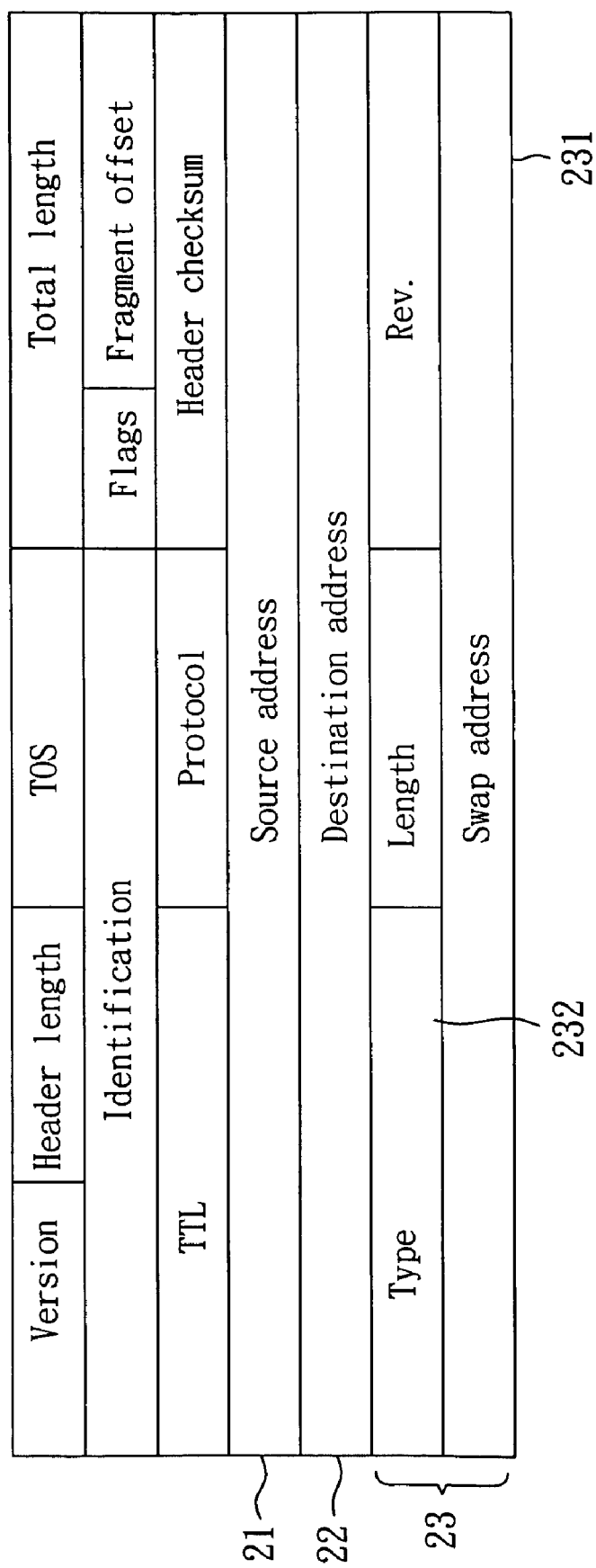
FIG. 2 is a table of a format of standard packet header according to the invention.

FIG. 2 shows a table of a standard format of packet header. As shown in FIG. 2, the header has adjacent fields including a source address field 21, a destination address field 22 and option fields 23. The purposes for the option fields 23 are defined by RFC 791. For example, for a value of 0x07 in a type field 232, the option field 23 is to record which routers the packets pass through; for a value of 0x44, the option field 23 is to record time; and for a value of 0x83 or 0x89, the option field 23 is to assign which routers the packets should pass through. In this embodiment, an option field 23 is defined as a swap address option field. Accordingly, when the type field 232 of the option field 23 is set to the swap address option field (e.g., Type=0x2a), a swap address field 231 of the option field 23 records a swap address used by the NAT system. The initial address of the swap address field 231 is 0.0.0.0 for the inventive system and method.

Figure 3:
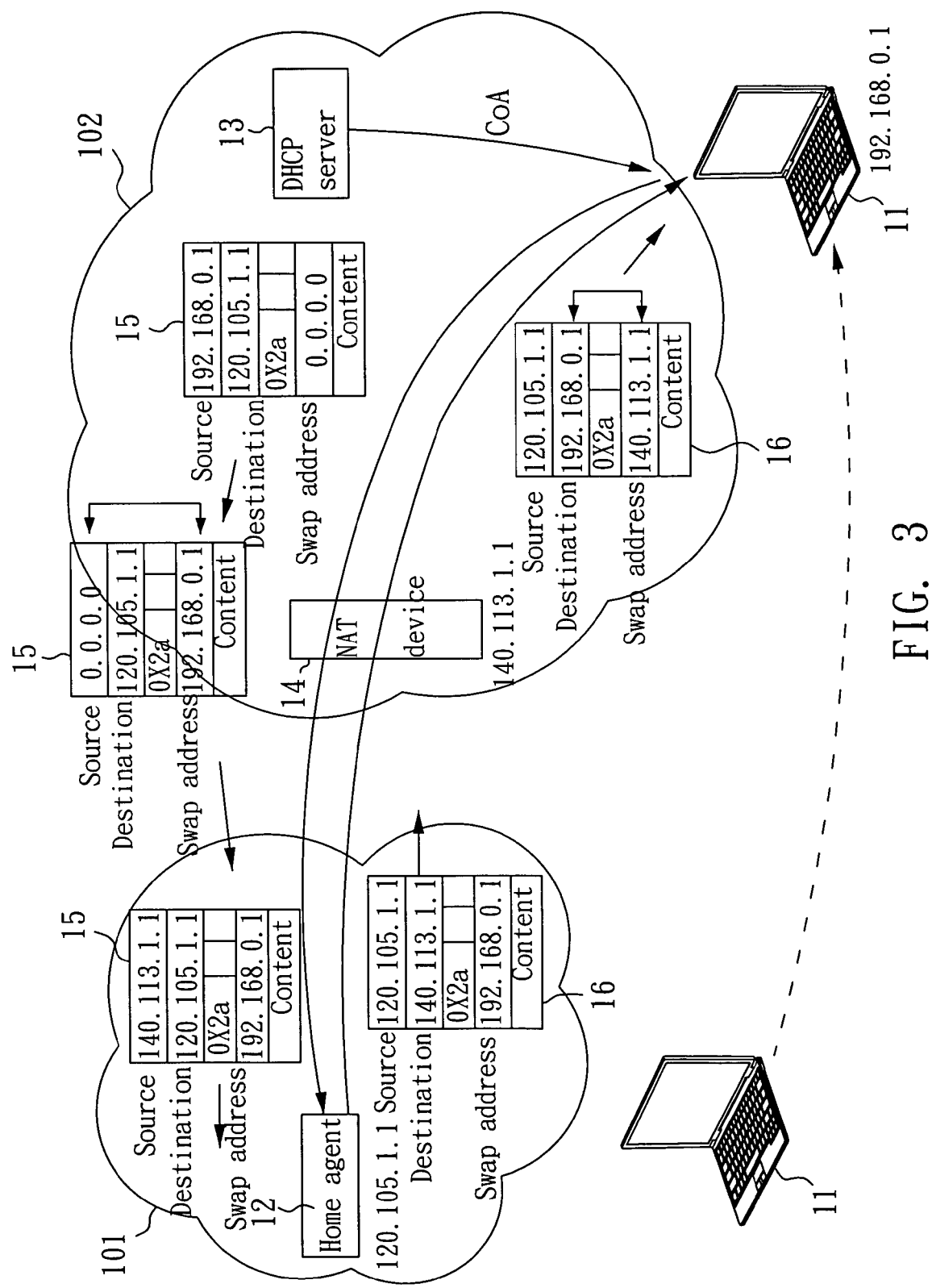
FIG. 3 is a schematic diagram of a NAT system for supporting mobile IP in private networks according to the invention, which further depicts a registration.

FIG. 3 is a schematic diagram of a NAT system for supporting mobile IP in private networks according to the invention. As shown in FIG. 3, when a mobile node 11 moves from its home network 101 to a foreign private network 102 and obtains a CoA (192.168.0.1) from a Dynamic Host Configuration Protocol (DHCP) server 13 of the private network 102. According to the mobile IP protocol, after obtaining the CoA, the mobile node 11 sends a registration packet 15 to a home agent 12 in the home network 101 for registration. The registration packet 15 has a header with a source address field containing the CoA (192.168.0.1) and a destination address field containing the address (120.105.1.1) of the home agent. Namely, the registration packet 15 contains the CoA (192.168.0.1), which indicates current location to the mobile node 11, and the swap address option field, which has a swap address (0.0.0.0). The registration packet 15 is processed by the NAT device 14 to find the swap address field. When the swap address field is found, the NAT device 14 swaps the source address (192.168.0.1) with the swap address (0.0.0.0). Thus, the swap address field contains the CoA (192.168.0.1) and the source address field contains the swap address (0.0.0.0). Next, the NAT device 14 translates the source address (here, (0.0.0.0)) into a public address (140.113.1.1) of the NAT device 14 according to NAT regulations, thereby sending the registration packet 15 to the home agent 12 in the home network 101.

After receiving the registration packet 15, the home agent 12 unpacks the content to know that the mobile node 11 is locating at the CoA (192.168.0.1). The home agent 12 responds a registration reply packet 16 with a header having a source address field containing the address (120.105.1.1) of the home agent 12 and a destination address field containing the public address (140.113.1.1) of the NAT device 14. The registration reply packet 16 also contains a swap address option field filled therein the CoA (192.168.0.1) obtained in the registration. The registration reply packet 16 is processed by the NAT device 14 to find the swap address field. When the swap address field is found, the NAT device 14 swaps contents of the destination and the swap address fields of the registration reply packet, i.e., swapping the public address (140.113.1.1) of the NAT device 14 with the CoA (192.168.0.1) such that the content of the destination address field becomes the CoA (192.168.0.1) and the content of the swap address field becomes the public address (140.113.1.1), thereby sending the registration reply packet to the mobile node and completing the registration.

Figure 4:
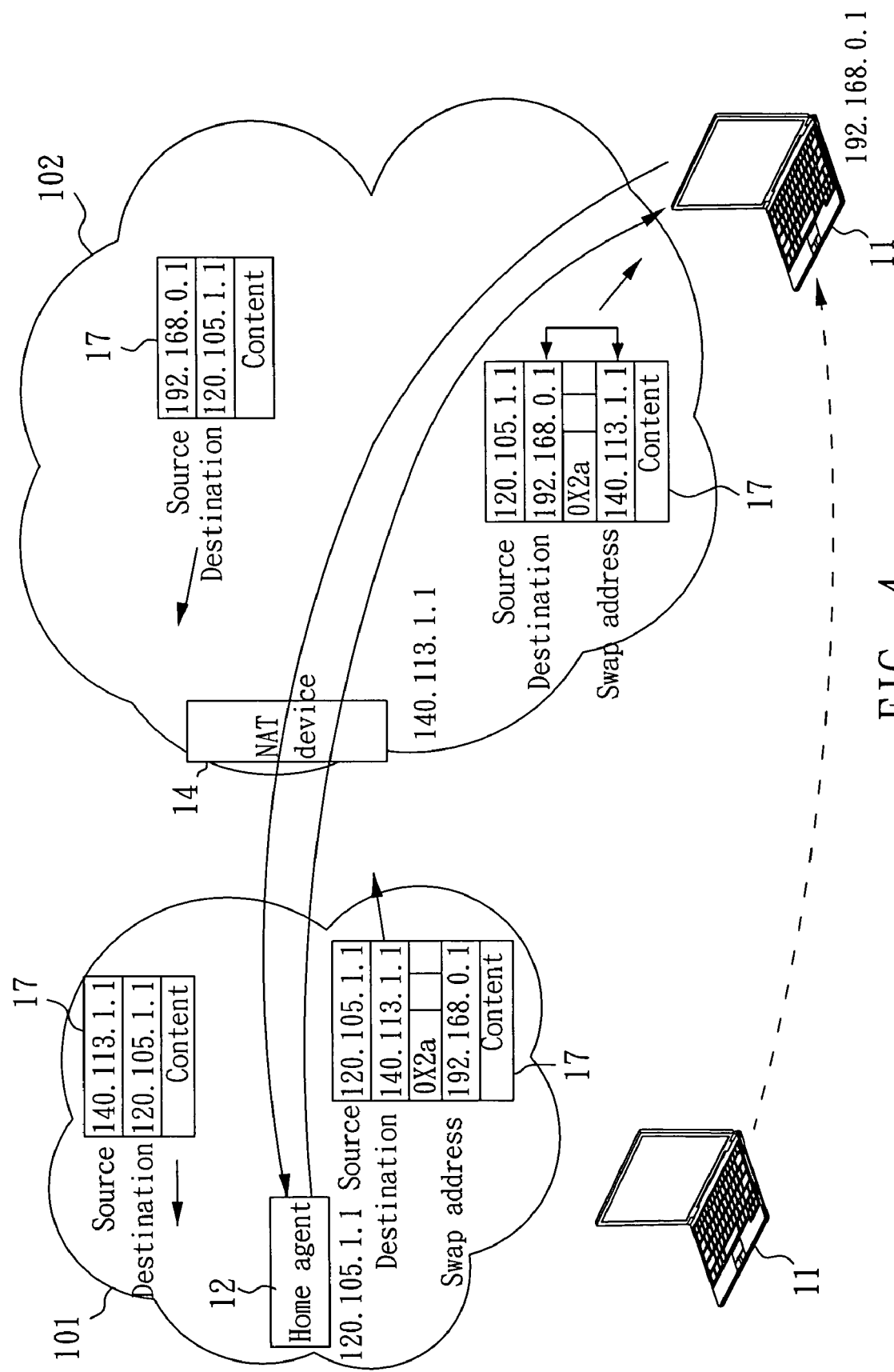
FIG. 4 is a schematic diagram of a NAT system for supporting mobile IP in private networks according to the invention, which further depicts a data packet transfer.

After completing the registration, as shown in FIG. 4, when the mobile node 11 moving to the private network 102 needs to send a data packet 17 to the home agent 12, the data packet 17 has a source address field containing the CoA (192.168.0.1) and a destination address field containing the address (120.105.1.1) of the home agent 12. The data packet does not contain a swap address field, but the NAT device 14 translates the source address (i.e., the CoA (192.168.0.1)) of the data packet 17 into the public IP address (140.113.1.1) of the NAT device 14 as usual, thereby sending the data packet 17 to the home agent 12.

As shown in FIG. 4, when the home agent 12 needs to send a data packet 17 to the mobile node 11 moving to the private network 102, the data packet 17 has a source address field containing the address (120.105.1.1) of the home agent 12 and a destination address field containing the public IP address (140.113.1.1) of the NAT device 14. In this case, the swap address field is set to the data packet. In addition, the CoA (192.168.0.1) of the mobile node 11 is obtained from the registration and filled in the swap address field of the data packet 17.

Next, the data packet 17 is sent to the NAT device 14. The NAT device 14 detects the data packet 17 received for finding the swap address field. When the swap address field is found, the NAT device 14 swaps, in the data packet 17, the destination address (i.e., the public address (140.113.1.1)) with the swap address (i.e., the CoA (192.168.0.1)). Thus, the content of the destination address field becomes the CoA (192.168.0.1) and the content of the swap address field becomes the public address (140.113.1.1) of the NAT device 14, thereby accurately sending the data packet 17 to the mobile node 11.

In view of the forgoing, it is known that the invention assigns an option field of an inherent packet header as a swap address field, thereby storing the private CoA of a mobile node, which is compatible with current NAT technology, and supporting mobile IP in the private network without using any mapping table or port number in the NAT device.

Although the present invention has been explained in relation to its preferred embodiment, it is to be understood that many other possible modifications and variations can be made without departing from the spirit and scope of the invention as hereinafter claimed.

What is claimed is:

1. A method for supporting mobile Internet protocol (IP) in private networks, wherein a mobile node moves from its home network to a foreign private network and obtains a care of address (CoA) from the private network, and the private network has a network address translation (NAT) device, the method comprising:
    a registration packet sending step, in which the mobile node sends a registration packet to a home agent in the home network, and the registration packet has a header with a source address field containing the CoA, a destination address field containing an address of the home agent and a swap address option field;
    a first NAT translating step, in which a NAT device swaps contents of the source and the swap address fields of the registration packet and translates the content of the source address field into a public address of the NAT device according to NAT regulations, thereby sending the registration packet to the home agent;
    a registration reply packet sending step, in which, after receiving the registration packet, the home agent responds a registration reply packet with a header having a source address field containing the address of the home agent, a destination address field containing the public address of the NAT device and a swap address option field filled therein the CoA; and
    a second NAT translating step, in which a NAT device swaps contents of the destination and the swap address fields of the registration reply packet, thereby sending the registration reply packet to the mobile node and completing registration.

2. The method as claimed in claim 1, wherein in the registration packet sending step, the registration packet contains a current CoA to indicate where the mobile node locates; and in the registration reply packet sending step, the home agent unpacks the registration packet to obtain the current CoA of the mobile node.

3. The method as claimed in claim 1, wherein in the registration packet sending step, the swap address option field is set to (0.0.0.0).

4. The method as claimed in claim 1, wherein in the registration packet sending step, the swap address option field of the registration packet is defined by an option field of the header; and in the registration reply packet sending step, the swap address option field of the registration reply packet is defined by an option field of the header.

5. The method as claimed in claim 4, wherein the swap address option fields are set respectively by a type field of the option field of the header.

6. The method as claimed in claim 1, further comprising:
    a first data packet sending step, in which the mobile node sends a first data packet to the home agent, and the first data packet has a header with a source address field containing the CoA and a destination address field containing the address of the home agent; and
    a third NAT translating step, in which the NAT device translates the CoA in the source address field of the first data packet into the public address of the NAT device, thereby sending the first data packet to the home agent.

7. The method as claimed in claim 6, further comprising:
    a second data packet sending step, in which the home agent sends a second data packet to the mobile node, and the second data packet has a header with a source address field containing the address of the home agent, a destination address field containing the public address of the NAT device and a swap address option field containing the CoA; and
    a fourth NAT translating step, in which the NAT device swaps, in the second data packet, the address of the home agent with the public address of the NAT device, thereby sending the second data packet to the mobile node.

8. The method as claimed in claim 7, wherein in the second data packet sending step, the CoA is filled in the swap address option field according to the registration completed.

9. The method as claimed in claim 7, wherein in the second data packet sending step, the swap address option field of the second data packet is defined by an option field of the header.

10. The method as claimed in claim 9, wherein the swap address option field of the second data packet is defined by a type field of the option field of the header.

11. A NAT system for supporting mobile IP in private networks, comprising:
    a home agent, which is implemented in a home network;
    at least one mobile node, which moves from the home network to a foreign private network and obtains a Care of Address (CoA) from the private network, and sends a registration packet to a home agent in the home network, wherein the registration packet has a header with a source address field containing the CoA, a destination address field containing an address of the home agent and a swap address option field; and
    a NAT device, which is implemented in the private network to swap contents of the source and the swap address fields of the registration packet and translate the content of the source address field into a public address of the NAT device according to NAT regulations, thereby sending the registration packet to the home agent; or swaps contents of a destination and a swap address fields of a registration reply packet, thereby sending the registration reply packet to the mobile node and completing registration,
    wherein after receiving the registration packet, the home agent responds the registration reply packet, and the registration reply packet has a header with a source address field containing the address of the home agent, a destination address field containing the public address of the NAT device and a swap address option field filled therein the CoA.

12. The system as claimed in claim 11, wherein the registration packet contains a current CoA to indicate where the mobile node locates and the home agent unpacks the registration packet to obtain the current CoA.

13. The system as claimed in claim 11, wherein the swap address option field of the registration packet sent by the mobile node is set to (0.0.0.0).

14. The system as claimed in claim 11, wherein the swap address option fields of the registration packet and the registration reply packet are defined by an option field of the header respectively.

15. The system as claimed in claim 14, wherein the swap address option fields of the registration packet and the registration reply packet are defined by a type field of the option field of the header respectively.

16. The system as claimed in claim 11, wherein after the registration is completed, the mobile node sends a first data packet to the home agent, and the first data packet has a header with a source address field containing the CoA and a destination address field containing the address of the home agent; and the NAT device translates the CoA in the source address field of the first data packet into the public address of the NAT device, thereby sending the first data packet to the home agent.

17. The system as claimed in claim 11, wherein after the registration is completed, the home agent sends a second data packet to the mobile node, and the second data packet has a header with a source address field containing the address of the home agent, a destination address field containing the public address of the NAT device and a swap address option field containing the CoA; and the NAT device swaps, in the second data packet, the address of the home agent with the public address of the NAT device, thereby sending the second data packet to the mobile node.

18. The system as claimed in claim 17, wherein the CoA is filled in the swap address option field according to the registration completed.

19. The system as claimed in claim 17, wherein the swap address option field of the second data packet is defined by an option field of the header.

20. The system as claimed in claim 19, wherein the swap address option field of the second data packet is defined by a type field of the option field of the header.

* * * * *